| United States Patent [19]
Heitz et al. | [11] Patent Number: 4,487,918
[45] Date of Patent: Dec. 11, 1984 |

[54] PROCESS FOR THE PRODUCTION OF BIFUNCTIONAL POLYPHENYLENE ETHERS

[75] Inventors: Walter Heitz, Kirchhain; Wilhelm Risse, Marburg, both of Fed. Rep. of Germany

[73] Assignee: Bayer Aktiengesellschaft, Leverkusen, Fed. Rep. of Germany

[21] Appl. No.: 567,325

[22] Filed: Dec. 30, 1983

[30] Foreign Application Priority Data

Jan. 12, 1983 [DE] Fed. Rep. of Germany ....... 3300792

[51] Int. Cl.³ ...................... C08G 65/44; C08G 65/48

[52] U.S. Cl. .................................... 528/212; 525/534; 528/125; 528/126; 528/128; 528/214; 528/218

[58] Field of Search .............. 528/125, 126, 128, 212, 528/214, 218; 525/534

[56] References Cited

U.S. PATENT DOCUMENTS 3,318,959  5/1967  Borman .............................. 260/613
4,156,770  5/1979  White .................................. 528/212

Primary Examiner—Lester L. Lee
Attorney, Agent, or Firm—Connolly and Hutz

[57] ABSTRACT

The invention relates to a process for the production of bifunctional polyphenylene ethers.

1 Claim, No Drawings

PROCESS FOR THE PRODUCTION OF BIFUNCTIONAL POLYPHENYLENE ETHERS

This invention relates to a process for the production of bifunctional polyphenylene ethers (polyphenylene oxides).

Polyphenylene ethers (or polyphenylene oxides) and several processes for their production are already known (cf. for example J. Am. Chem. Soc 81, 6335 (1959), J. Polym. Sci. 58, 581 (1962), U.S. Pat. Nos. 3,306,879; 3,914,266; 3,956,442 and 3,965,069).

Thus, NL-PS No. 64 13 958, for example, describes a process for the production of polyphenylene ethers in which monofunctional polyphenylene ethers are reacted with NaOH or KOH to form polyfunctional polyphenylene ethers.

DE-OS No. 28 22 856 describes a process for the production of polyphenylene oxides containing two terminal hydroxyl groups. In the process, polyphenylene oxides containing a single hydroxyl group receive another hydroxyl group through the incorporation of quinones.

The present invention provides a process for the production of bifunctional polyphenylene oxides corresponding to the following formula (I):

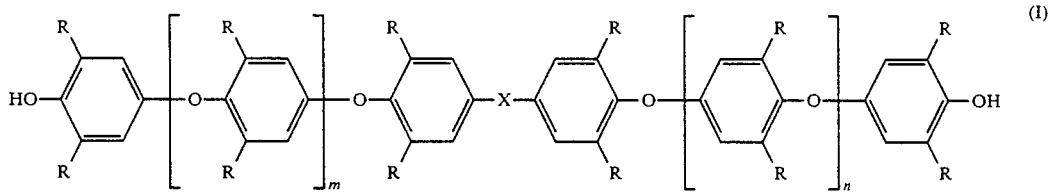

in which
the groups represented by R, may be the same or different, and each represents a hydrogen atom or an alkyl radical containing from 1 to 4 carbon atoms, preferably hydrogen or a methyl radical,
X represents a group

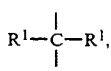

in which $R^1$ represents hydrogen or an alkyl radical containing from 1 to 4 carbon atoms, and
m and n represent 0 or an integer of from 0 to 200 and preferably from 5 to 60,
characterised in that polyphenylene ethers corresponding to the following formula (II):

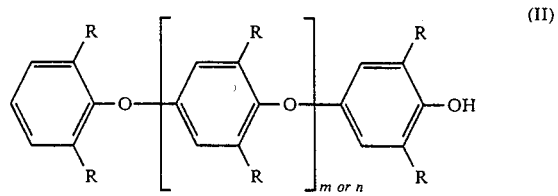

in which R, m and n have the same meaning as in formula (I), and reacted with carbonyl compounds corresponding to the following formula (III):

$$R^1-\underset{\underset{O}{\|}}{C}-R^1 \qquad (III)$$

in which
$R^1$ may be the same or different and have the same meaning as in formula (I),
in an organic solvent in the presence of a catalyst at a temperature of from $-30°$ to $200°$ C. and optionally under elevated pressure.

Suitable carbonyl compounds corresponding to the general formula (III) are aldehydes, for example formaldehyde (for example even in its trimeric form as trioxane or as paraformaldehyde), acetaldehyde, butyraldehyde, and ketones, such as acetone, methylethyl ketone. It is preferred to use aldehydes, of which formaldehyde (preferably in the form of trioxane) is particularly preferred.

Suitable organic solvents are aromatic solvents, such as benzene, toluene, nitrobenzene, halogenated solvents, such as carbon tetrachloride, dichloroethane, trichloroethane, chlorobenzene and carbon disulfide.

Suitable catalysts are metal halides which react as Lewis acids under the reaction conditions, for example the chlorides of elements of the Second, Fourth and Eighth Secondary Groups and of elements of the Third and Fifth Main Groups of Mendelejew's Periodic System of Elements, Hofmann Rudorff, Anorganische Chemie, 19th Edition, 1963, page 97, Vieweg Verlag, Brunswick, such as $ZnCl_2$, $FeCl_3$, $SnCl_4$, $TiCl_4$, $SbCl_5$, $BF_3$, $AlCl_3$. It is also possible to use acids, such as proton acids, for example hydrogen halides, such as HF, HCl, HBr, polyphosphoric acids, $H_2SO_4$, p-toluene sulfonic acid, halogenated carboxylic acids, such as trifluoroacetic acid, and sulfonic acids, such as trifluoromethane sulfonic acid.

The reaction according to the invention is carried out at a temperature in the range from $-30°$ to $200°$ C. and preferably at a temperature in the range from $0°$ C. to $80°$ C. and under a pressure of from 0 to 15 bars and preferably under a pressure of from 0 to 5 bars.

From 0.5 to 2 moles of the carbonyl compound of formula (III) may be used per mole of polyphenylene ether corresponding to general formula (II).

The process according to the invention may be carried out as follows: the carbonyl compound and the polyphenylene ether are initially introduced in the solvent and an inert gas atmosphere is established (for example with $N_2$, Ar), followed by introduction of the catalyst in the organic solvent. The resulting mixture is left standing for a period of from a few hours to several days at the reaction temperature. The bifunctional polyphenylene oxide is then isolated, for example by precipitation with an alcohol (for example methanol). Analysis of the reaction products may be carried out in the usual way (for example molecular weight determination by osmometry, determination of the OH-number, for example by titration).

Both symmetrical and asymmetrical bifunctional polyphenylene ethers may be obtained by the process according to the invention. According to the invention, asymmetrical products are obtained when the polyphenylene ethers of formula (II) used have different molecular weights (different values for m and n).

It is possible by the process according to the invention to produce polymer blocks containing two functional terminal groups which have a high glass transition temperature. These blocks may be reacted, for example, with acid chlorides such as phosgene, terephthaloyl chloride, with diisocyanates, with carbonates and with other polymer blocks to form high molecular weight compounds. Materials produced from these high molecular weight compounds are characterised by their high dimensional stability under heat.

EXAMPLE 1

1.2 g of o,o'-dimethylpolyphenylene oxide ($M_n=2700$, vapour pressure osmometry) (=0.44 mMole) are initially introduced under nitrogen into a 50 ml flask. 10 ml of chlorobenzene are then added, followed by stirring until the polyphenylene oxide is dissolved. The flask is closed with a septum on which a 2 ml syringe and a 1 ml syringe are mounted.

This apparatus is heated to 55° C. in an oil bath. A solution of 10.8 mg of trioxane (=0.12 mMoles) in 1.5 ml of chlorobenzene and 42.6 mg of BF$_3$-etherate (0.3 mMole, 36% excess) are respectively introduced with stirring from the two syringes in 7 substantially equal portions at equal time intervals over a period of 2 hours. After a reaction time of another 18 hours at 55° C., the product is precipitated by the addition of 100 ml of methanol, separated off and dried. Yield: 0.95 g (79% of the theoretical yield). Molecular weight ($M_n$) as determined by vapour pressure osmometry: 5100.

An equivalent weight of 2750 is obtained by titration of the phenolic hydroxyl groups, corresponding to an OH-functionality of 1.85.

EXAMPLE 2

4 g of o,o'-dimethyl polyphenylene oxide ($M_n=1300$) and 51.6 mg of trioxane are dissolved in 50 ml of chlorobenzene and the resulting solution introduced under nitrogen into a reaction vessel. 242 mg of BF$_3$.Et$_2$O dissolved in 2 ml of chlorobenzene are added dropwise with stirring over a period of 30 minutes, after which time the reaction mixture is stirred for another 48 hours at room temperature. The product is precipitated by the addition of 500 ml of methanol. Yield: 3.02 g (75% of the theoretical yield); $M_n=2600$ (average as determined by vapour pressure osmometry); titrated OH-functionality 2.18.

EXAMPLE 3

3 g of o,o'-dimethyl polyphenylene oxide ($M_n=1300$), 36.9 g of trioxane and 100 mg of ZnCl$_2$ are introduced with 60 ml of benzene into a stirrer-equipped autoclave. HCl is introduced at 60° C. up to a pressure of 5 bars. After a reaction time of 20 hours, the product is precipitated by the addition of 500 ml of methanol. Yield 2.16 g (72% of the theoretical yield), $M_n=1800$ (average as determined by vapour pressure osmometry); titrated OH-functionality: 1.48.

We claim:
1. A process for the production of bifunctional polyphenylene oxides corresponding to the formula

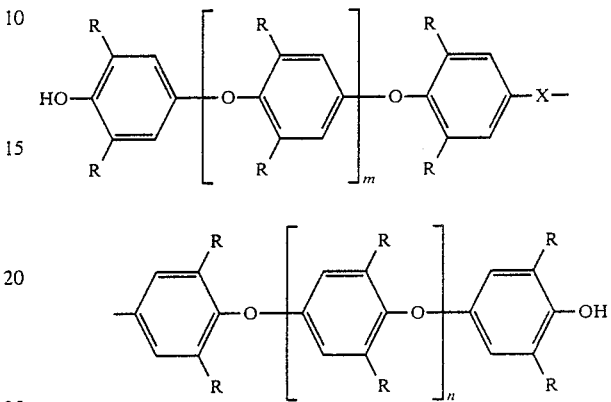

in which
R is the same or different and represents hydrogen or alkyl containing from 1 to 4 carbon atoms;
X is of the formula

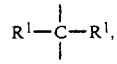

in which R$^1$ is hydrogen or alkyl containing from 1 to 4 carbon atoms; and
m and n represent an integer of from 0 to 200;
said process comprising reacting 0.5 to 2 moles of carbonyl compounds of the formula

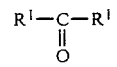

with each mole of polyphenylene ethers of the formula

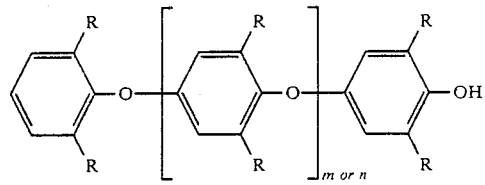

in an organic solvent, in the presence of a catalyst at a temperature in the range from −30° to 200° C. and a pressure of 0 to 15 bar.

* * * * *